UNITED STATES PATENT OFFICE.

BENEDICT FREY, OF NEW YORK, N. Y., ASSIGNOR TO HENRY MAURER, OF SAME PLACE.

GLAZE FOR CLAY ARTICLES.

SPECIFICATION forming part of Letters Patent No. 517,609, dated April 3, 1894.

Application filed December 8, 1893. Serial No. 493,166. (No specimens.)

*To all whom it may concern:*

Be it known that I, BENEDICT FREY, a citizen of the United States, and a resident of the city, county, and State of New York, have invented certain new and useful Improvements in Glazes for Clay Articles, of which the following is a specification.

This invention relates to an improved glaze for coating gas-retorts, paving-blocks, floor-plates and other articles made of clay, so that the same can resist in a higher degree the wear to which these articles are subjected and that they are thereby rendered more durable for use; and the invention consists of a glaze for clay-articles composed of pulverized basalt, potassium carbonate and potassium nitrate which are mixed, melted together and pulverized after melting, and then applied to the articles to be glazed.

In preparing my improved glaze, the following proportions of the ingredients have given good results, namely, one hundred and fifty parts of pulverized basalt, forty parts of potassium carbonate, and fifteen parts of potassium nitrate, which are thoroughly mixed and then subjected to heat, until they are thoroughly melted together. The melted mass is ground after cooling and mixed with water until a cream-like consistency is obtained. A small quantity of gum arabic, fine white glue or any other adhesive substance (three to five per cent. of the entire mass) is then added to the thickly-flowing glaze, so that the same adheres better to the surface of the retort, paving-blocks or other articles of clay or fire-clay, which are to be glazed. The articles are then burned in the usual manner, the glaze imparting a grayish tint to the same and a uniform, firmly-adhering and permanent glaze, which the articles can resist for a greater length of time the wear to which they are subjected during the use of the same.

Having thus described my invention, I claim as new and desire to secure by Letters Patent—

1. A glaze for clay-articles, composed of a melted and pulverized mixture of basalt, potassium carbonate and potassium nitrate, substantially as set forth.

2. A glaze for clay, composed of a melted and pulverized mixture of ground basalt, potassium carbonate and potassium nitrate, with water and a suitable adhesive substance, substantially as set forth.

3. The process herein described of preparing a glaze for clay-articles, which consists in mixing pulverized basalt potassium carbonate and potassium nitrate, melting the same together, pulverizing the melted mass and mixing the same with water and some adhesive substance, substantially as set forth.

In testimony that I claim the foregoing as my invention I have signed my name in presence of two subscribing witnesses.

BENEDICT FREY.

Witnesses:
PAUL GOEPEL,
K. R. BRENNAN.